(12) United States Patent
Brown et al.

(10) Patent No.: US 11,301,279 B2
(45) Date of Patent: *Apr. 12, 2022

(54) ASSOCIATING VIRTUAL IP ADDRESS OF VIRTUAL SERVER WITH APPROPRIATE OPERATING SYSTEM IN SERVER CLUSTER

(71) Applicant: INTERNATIONAL BUSINESS MACHINES CORPORATION, Armonk, NY (US)

(72) Inventors: Patrick Gerald Brown, Hillsborough, NC (US); Jerry Stevens, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/285,492

(22) Filed: Feb. 26, 2019

(65) Prior Publication Data

US 2020/0272490 A1 Aug. 27, 2020

(51) Int. Cl.
*G06F 9/455* (2018.01)
*G06F 9/4401* (2018.01)
(Continued)

(52) U.S. Cl.
CPC ........ *G06F 9/45558* (2013.01); *G06F 9/4406* (2013.01); *H04L 61/2007* (2013.01);
(Continued)

(58) Field of Classification Search
None
See application file for complete search history.

(56) References Cited

U.S. PATENT DOCUMENTS 6,430,622 B1 8/2002 Aiken, Jr. et al.
6,996,617 B1 2/2006 Aiken, Jr. et al.
(Continued)

FOREIGN PATENT DOCUMENTS

WO 2014151839 A1 9/2014

OTHER PUBLICATIONS

Anonymous, "Implementing Network Functions Virtualization (NFV)/Services Near the Virtual Machine Directly to the Virtual Network Interface Card (vNIC)," Jun. 6, 2016, An IP.com Prior Art Database Technical Disclosure, IP.com No. IPCOM000246427D.

(Continued)

*Primary Examiner* — Wynuel S Aquino
(74) *Attorney, Agent, or Firm* — Cantor Colburn LLP; Teddi Maranzano

(57) ABSTRACT

According to one or more embodiments, a computer implemented method includes receiving, by an operating system of a computer server, a request to execute an instance of a computer application. The method further includes deploying a virtual container for the instance of the computer application, the virtual container is allocated a dynamic virtual interne protocol address (DVIPA). The method further includes instantiating an application instance of the computer application in the virtual container. The method further includes, based on a determination that the computer application is a non-native application for the operating system, creating for the virtual container, a virtual network interface card (NIC) that translates network communication between the application instance and a physical NIC of the computer server. The method further includes selecting, by the virtual NIC, a communication protocol stack, from multiple communication protocol stacks, to bind the application instance for transferring the network communication.

20 Claims, 11 Drawing Sheets

(51) Int. Cl.
 *H04L 67/10* (2022.01)
 *H04L 61/5007* (2022.01)
 *H04L 101/618* (2022.01)

(52) U.S. Cl.
 CPC .... *H04L 67/10* (2013.01); *G06F 2009/45595* (2013.01); *H04L 61/6018* (2013.01)

(56) References Cited

U.S. PATENT DOCUMENTS

| | | | |
|---|---|---|---|
| 7,430,611 | B2 | 9/2008 | Aiken, Jr. et al. |
| 7,711,831 | B2 | 5/2010 | Aiken, Jr. et al. |
| 8,479,278 | B2 | 7/2013 | Grouzdev |
| 8,640,127 | B2 | 1/2014 | Gracin |
| 8,868,790 | B2 | 10/2014 | Lovett et al. |
| 8,892,706 | B1 | 11/2014 | Dalal |
| 9,063,905 | B2 | 6/2015 | Baird |
| 9,229,743 | B2* | 1/2016 | Sundaresan ......... G06F 12/0253 |
| 9,542,214 | B2 | 1/2017 | Stevens et al. |
| 2006/0155801 | A1 | 7/2006 | Brabson |
| 2012/0076006 | A1 | 3/2012 | Decusatis |
| 2013/0044759 | A1* | 2/2013 | Reed ................ H04L 69/08 370/401 |
| 2015/0365281 | A1* | 12/2015 | Marino ............ H04L 45/586 709/223 |
| 2017/0126791 | A1 | 5/2017 | Herr |
| 2017/0142001 | A1 | 5/2017 | Brabson |
| 2017/0269978 | A1* | 9/2017 | Engel ................ G06F 9/541 |
| 2017/0289040 | A1 | 10/2017 | Sreeramouju |
| 2018/0041468 | A1 | 2/2018 | Miller et al. |
| 2018/0062908 | A1 | 3/2018 | Rachamadugu |
| 2018/0074839 | A1* | 3/2018 | Pachlore ............ G06F 9/445 |
| 2018/0248986 | A1 | 8/2018 | Dalal |
| 2019/0068505 | A1* | 2/2019 | Arora ............... G06F 9/45558 |
| 2019/0303345 | A1* | 10/2019 | Zhu .................. G06F 12/1072 |
| 2020/0076685 | A1* | 3/2020 | Vaidya ............. H04L 12/4641 |
| 2020/0145369 | A1* | 5/2020 | Andrew ............. G06F 3/0653 |

OTHER PUBLICATIONS

Anonymous, "Improving the Usability of Network Virtualization and Management in a Clustered Switch Architecture with IEEE 802.1 Qbg Technology," Mar. 28, 2014, An IP.com Prior Art Database Technical Disclosure, IP.com No. IPCOM000235884D.

Anonymous, "Method To Eliminate Guest VM Data In Host Kernel Dump Using Dynamic Taint Tracking," An IP.com Prior Art Database Technical Disclosure, IP.com No. IPCOM000235053D, Feb. 26, 2014, pp. 1-3.

Anonymous, "Method to Initiate the Removal of a Virtual Machine Instance from the Instance to be Removed," An IP.com Prior Art Database Technical Disclosure, IP.com No. IPCOM000240383D, Jan. 28, 2015, pp. 1-2.

Anonymous, "Supporting migration of Virtual machines running Multi-tier applications in Computing clouds that span multiple IP address ranges," An IP.com Prior Art Database Technical Disclosure, IP.com No. IPCOM000198971D, Aug. 19, 2010, pp. 1-6.

Anonymous, "System and Method for a Dynamic Virtual Network Partition Infrastructure," An IP.com Prior Art Database Technical Disclosure, IP.com No. IPCOM000195263D, Apr. 27, 2010, pp. 1-7.

Zec, "Implementing a Clonable Network Stack in the FreeBSD Kernel," 2003, USENIX Annual Technical Conference, Retrieved from the Internet at http://www.usenix.org/events/usenix03/.

Basak et al., "Virtualizing networking and security in the cloud," SIGOPS Operating Systems Review, vol. 44, Issue 4, Dec. 2010, pp. 86-94.

Fabienne, "Network Virtualization: Performance, Sharing and Applications," 2011, Networking and Internet Architecture [cs.NI], Retrieved from the internet at https://tel.archives-ouvertes.fr/tel-00793367.

Ganguly et al., "IP over P2P: Enabling Self-configuring Virtual IP Networks for Grid Computing," Advanced Computing and Information Systems Laboratory, University of Florida, Mar. 2006, pp. 1-10.

List of IBM Patents or Patent Applications Treated as Related; Date Filed: Jun. 19, 2019, 2 pages.

Stevens et al., "Virtual Container Dynamic Virtual IP Address," U.S. Appl. No. 16/285,487, filed Feb. 26, 2019.

Stevens et al., "Virtual Container Extended Network Virtualization in Server Cluster," U.S. Appl. No. 16/285,493, filed Feb. 26, 2019.

Nakagawa et al. "Dynamic virtual network configuralion between containers using physical switch functions for NFV infrastructure." 2015 IEEE Conference on Network Function Virtualization and Software Defined Network. Nov. 2015. IEEE Pres. 156-162 (Year: 2015).

* cited by examiner

ASSOCIATING VIRTUAL IP ADDRESS OF VIRTUAL SERVER WITH APPROPRIATE OPERATING SYSTEM IN SERVER CLUSTER

BACKGROUND

The present application relates to computer technology, and more specifically, to virtual machines.

Cloud computing facilitates the ability to provision a virtual machine for a customer quickly and easily, without requiring the customer to purchase hardware or provide floor space for a physical server. The customer may expand or contract the virtual machine according to changing preference(s). Typically, the cloud computing provider provisions the virtual machine, which is physically resident at the provider's datacenter. In this environment, the customer's virtual machine is running as a guest and the cloud provider uses hypervisor code running as a host to virtualize the server resources between multiple virtual machines, possibly belonging to different customers.

SUMMARY

According to one or more embodiments, a computer implemented method includes receiving, by an operating system of a computer server, a request to execute an instance of a computer application. The method further includes deploying a virtual container for the instance of the computer application, the virtual container is allocated a dynamic virtual interne protocol address (DVIPA). The method further includes instantiating an application instance of the computer application in the virtual container. The method further includes, based on a determination that the computer application is a non-native application for the operating system, creating for the virtual container, a virtual network interface card (NIC) that translates network communication between the application instance and a physical NIC of the computer server. The method further includes selecting, by the virtual NIC, a communication protocol stack, from multiple communication protocol stacks, to bind the application instance for transferring the network communication.

According to one or more embodiments, a system includes a physical network interface card (NIC), a memory, and a processor coupled with the physical NIC and the memory. The processor performs network virtualization using a method that includes receiving, by an operating system of a computer server, a request to execute an instance of a computer application. The method further includes deploying a virtual container for the instance of the computer application, the virtual container is allocated a dynamic virtual internet protocol address (DVIPA). The method further includes instantiating an application instance of the computer application in the virtual container. The method further includes, based on a determination that the computer application is a non-native application for the operating system, creating for the virtual container, a virtual network interface card (NIC) that translates network communication between the application instance and a physical NIC of the computer server. The method further includes selecting, by the virtual NIC, a communication protocol stack, from multiple communication protocol stacks, to bind the application instance for transferring the network communication.

According to one or more embodiments, a computer program product includes a computer readable storage medium that includes computer executable instructions, which when executed by a processing unit causes the processing unit to perform a method that includes receiving, by an operating system of a computer server, a request to execute an instance of a computer application. The method further includes deploying a virtual container for the instance of the computer application, the virtual container is allocated a dynamic virtual internet protocol address (DVIPA). The method further includes instantiating an application instance of the computer application in the virtual container. The method further includes, based on a determination that the computer application is a non-native application for the operating system, creating for the virtual container, a virtual network interface card (NIC) that translates network communication between the application instance and a physical NIC of the computer server. The method further includes selecting, by the virtual NIC, a communication protocol stack, from multiple communication protocol stacks, to bind the application instance for transferring the network communication.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
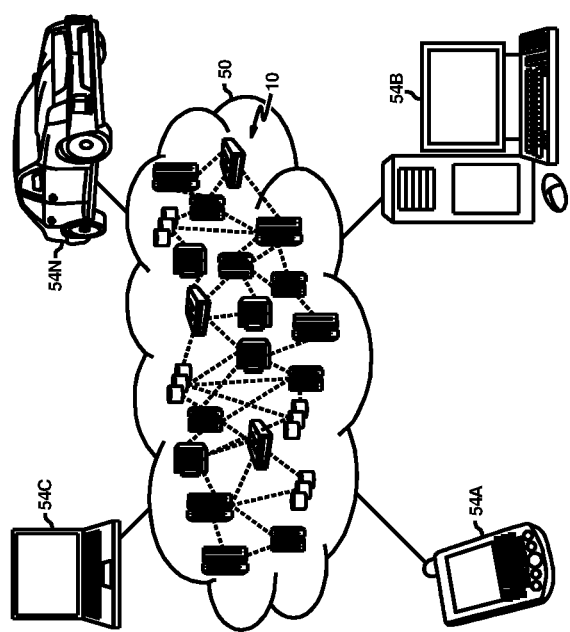
FIG. 1 depicts a cloud computing environment according to an embodiment of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In general, within the technology area associated with server computer platforms, there are various forms of system architecture for providing virtualization of hardware resources. The various approaches both span and overlap across many platform types. Various virtualization techniques allow compute resources to be shared or virtualized among multiple instances of "virtual servers". Examples of this type of virtualization include instances of a virtual host (i.e. a virtual machine or a virtual guest), a virtual processor, a virtual memory, and virtual I/O resources etc. Many platforms provide multiple tiers or layers of virtualization. The virtualization layer is referred to as the hypervisor.

One objective of the hypervisor is to provide the ability for multiple instances of a guest to share the platform's underlying physical compute resources. The hypervisor can include a combination of software, firmware, and hardware to virtualize the compute resources in this manner. A technical challenge for the hypervisor is maximizing the ability to run as many copies (instances) of applications or application workloads using the given footprint i.e. hardware compute resources in the host server that the hypervisor is executing on. How a virtualization technique scales then becomes paramount. The complexity of the administrative model is often the next most significant problem. It should be noted that running more instances of the guest operating system (OS) does not solve this technical challenge, rather, executing more instances of the application (applications) drives up the ability to scale the workload to allow more work to be accomplished.

Accordingly, one or more embodiments of the present invention address such technical challenges by running compute platforms in the so called "cloud" environment where the application might execute in a "container" that obfuscates the underlying server or simply does not require another instance of a virtual server.

A brief description of background technology now follows, after which, particular features used by one or more embodiments of the present invention for injecting interrupts and/or exceptions into secure virtual machines (VMs) by a hypervisor are described. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone, or tablet computer 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
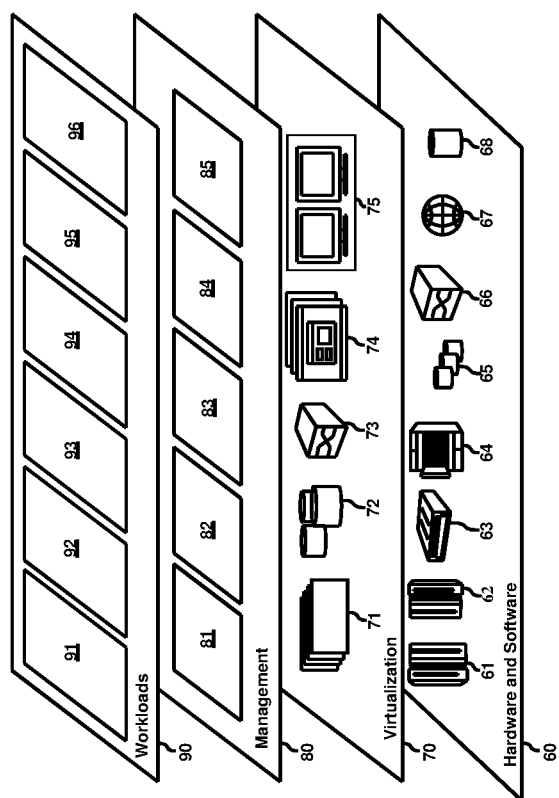
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual machines 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and source-code versioning 96. It is understood that these are just some examples and that in other embodiments, the layers can include different services.

As noted earlier, a technical challenge is to facilitate the workloads layer 90 to execute maximum number of instances of applications/workloads that share the compute resources available. However, maximizing application instances can create a conflict—application instances require OS services, but adding multiple OS instances drive up cost and complexity as noted earlier. One or more embodiments of the present invention address the conflict between the need for more application compute power vs. avoiding adding virtual servers to host the applications by virtualizing network I/O resources in computer servers in a server cluster.

Figure 3:
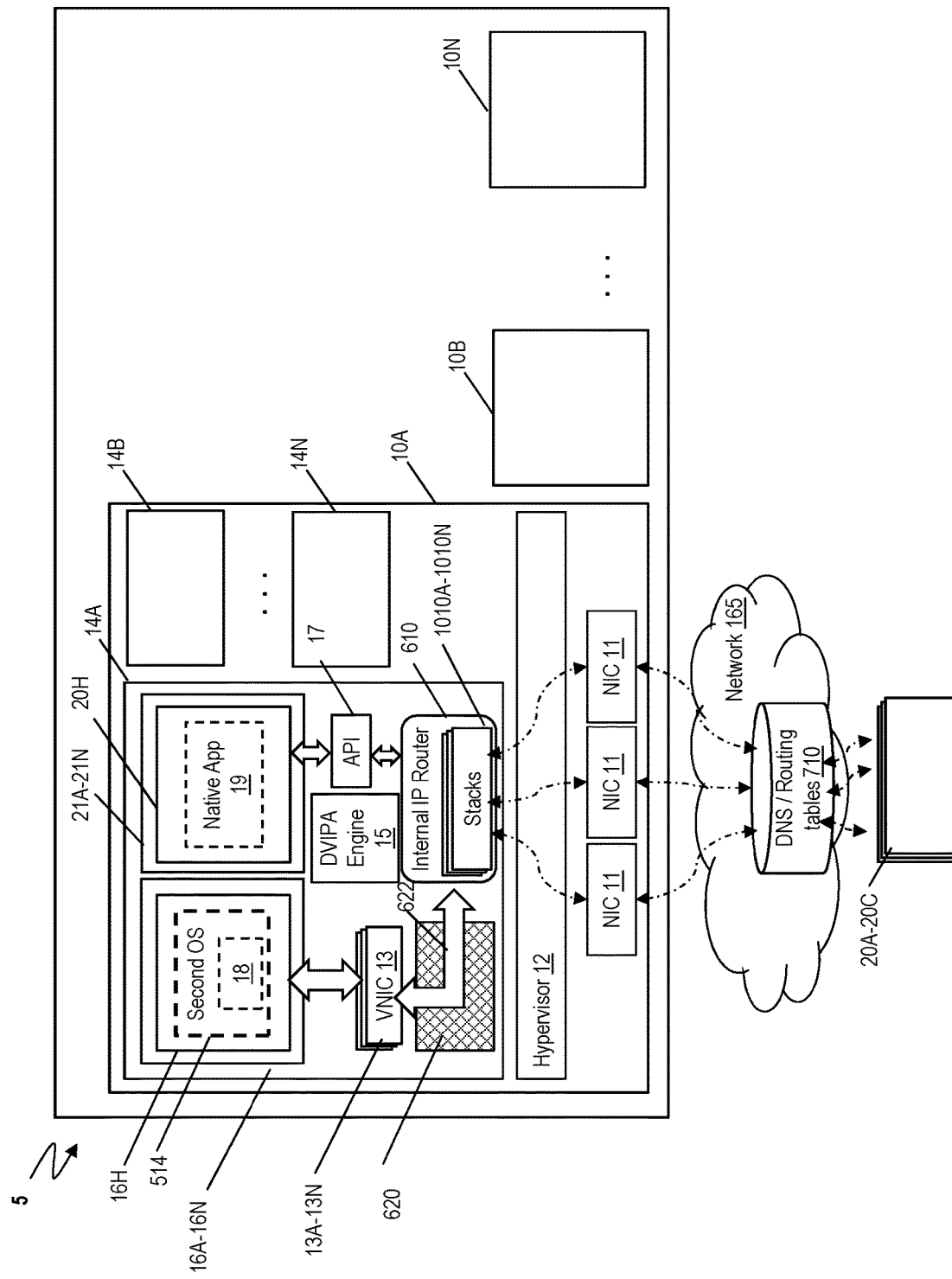
FIG. 3 illustrates an example components of a computer server cluster according to one or more embodiments of the present invention.

FIG. 3 illustrates an example components of a computer server cluster according to one or more embodiments of the present invention. The depicted server cluster 5 includes one or more computer servers 10A-10N, N being any integer. The server cluster 5 is in communication with one or more client devices 20A-20C, C being any integer. The clients 20A-20C and the computer servers 10A-10N of the server cluster 5 communicate with each other via a network 165 that is external to the server cluster 5. The client devices 20A-20C can communicate with one or more computer servers 10A-10N of the server cluster 5 via the network 165. The network 165 can include one or more hops such as one or more domain name servers (DNS), routers, and the like, which facilitate the network communication between the clients 20A-20C and the server cluster 5.

Cloud computing as described herein relies on the computer networks ("network") 165 for transfer of data and commands to and from the server cluster 5 and the clients 20A-20C. The network 165 typically uses the Internet Protocol (IP). IP is a connectionless protocol. IP packets are routed from originator through a network of routers to the destination. All physical adapter devices in such a network, including those for client 20A and servers 10A-10N, are identified by an IP Address which is unique within the network 165. One feature of IP is that a failure of an intermediate router node or adapter will not prevent a packet from moving from source to destination, as long as there is an alternate path through the network 165.

Figure 4:
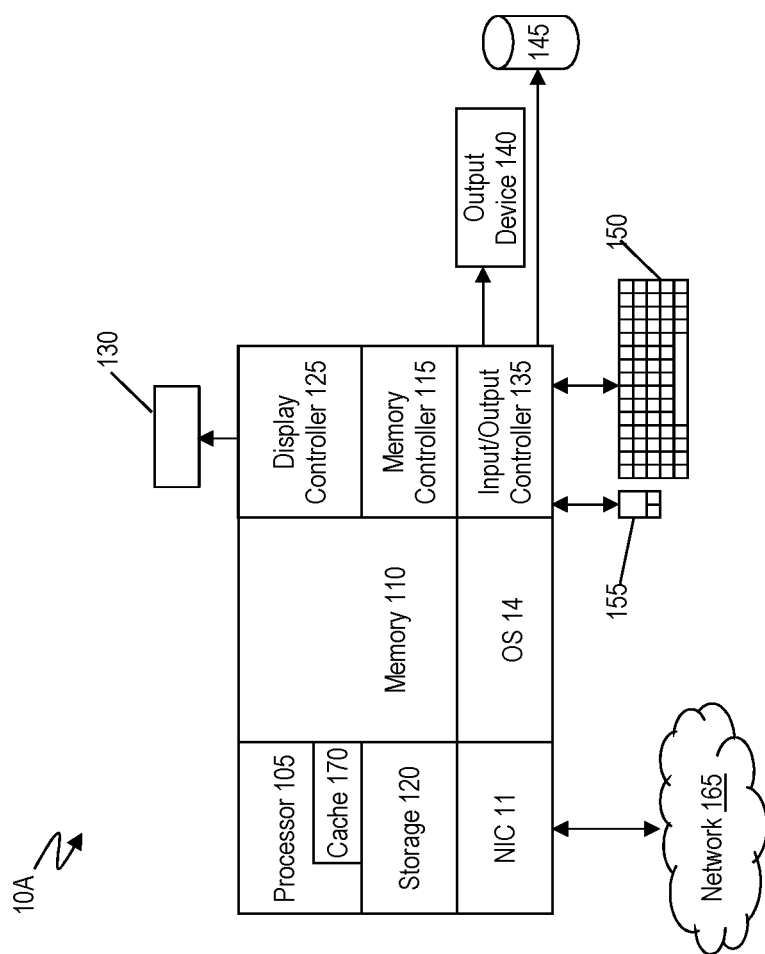
FIG. 4 illustrates components of an example computer server according to one or more embodiments of the present invention.

In Transmission Control Protocol/Internet Protocol (TCP/IP), TCP sets up a connection between two endpoints, identified by the respective IP addresses and a port number on each device. Unlike failures of an adapter in an intermediate node, if one of the endpoint adapters (or the link leading to it) fails, all connections through that adapter fail, and must be reestablished. If the failure is on a client device 20A, only the relatively few client connections are disrupted, and usually only one person is inconvenienced. However, network hardware (e.g. NIC 11) failure on the computer server 10A can lead to hundreds or thousands of connections to be disrupted to/from all client devices 20A-20C that are in communication with that computer server 10A. This technical challenge is addressed by one or more embodiments of the present invention FIG. 4 illustrates components of an example computer server according to one or more embodiments of the present invention. The computer server 10A may be a computer, such as a server computer, a desktop computer, a tablet computer, a smartphone, or any other computer that executes the hypervisor, which in turn deploys the OS 14A-14N. The computer server 10A includes components that include hardware, such as electronic circuitry. The computer server 10A includes, among other components, a processor 105, memory 110 coupled to a memory controller 115, and one or more input devices 145 and/or output devices 140, such as peripheral or control devices that are communicatively coupled via a local I/O controller 135. These devices 140 and 145 may include, for example, battery sensors, position sensors (altimeter 40, accelerometer 42, GPS 44), indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, multiple network interface cards (NIC) 11 or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the computer server 10, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, flash memory, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable hypervisor 12. The hypervisor 12 may control the execution of the OS 14A-14N, each of which may control execution of other computer programs and provides scheduling, input-output control, file and data management, memory management, and communication control and related services. In an example, such as the z Systems™, a manufacturer of the computer server 10A may provide the hypervisor 12. In the case of a system with a structure unlike that of z Systems, where the hypervisor 12 is not provided by the hardware manufacturer, the cloud computing provided may use a hypervisor 12 such as from VMWARE™, or other hypervisor providers. In an example, the administrator of the physical computer server 10A is unable to modify the hypervisor 12, except when needed in order to apply service provided by the manufacturer. For example, the hypervisor 12 may be provided as part of a "Licensed Internal Code (LIC)" and/or microcode for the computer server 10A. The hypervisor 12 is a virtual machine monitor (VMM), and can include a combination of software, firmware, or hardware that deploys VMs and VCs. The hypervisor 12 provides services to the OS 14A-14N to use the hardware components of the computer server 10A to execute programs, store data, perform network communications, and the like. Examples of the hypervisor 12 include IBM z Systems®, ORACLE VM SERVER™, CITRIX XENSERVER™, VMWARE ESX™, MICROSOFT HYPER-V™, etc.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The computer server 10A may further include a display controller 125 coupled to a user interface or display 130. In some embodiments, the display 130 may be an LCD screen. In other embodiments, the display 130 may include a plurality of LED status lights. In some embodiments, the computer server 10A may further include a network interface 11 for coupling to a network 165. The network 165 may be an IP-based network for communication between the computer server 10A and an external server, client and the like via a broadband connection. In an embodiment, the network 165 may be a satellite network. The network 165 transmits and receives data between the computer server 10A and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals. In one or more examples, each of the physical NIC 11 can be connected to separate external networks 165, for example, a first physical NIC 11 is connected to an Ethernet network, a second physical NIC 11 is connected to an Infiniband$^{SM}$ network, and the like.

The client device 20A can be a communication device such as a desktop computer, a tablet computer, a phone, a personal digital assistant, a laptop computer, a server computer, or any other such computing device that can communicate with the server cluster 5 using one or more of the networks 165. A client device 20A or can request deployment of a virtual machine or initiation of an instance of a software application by the OS 14A of the computer server 10A.

Referring again to FIG. 3, each of the computer servers 10A-10N can be a datacenter or host server, of a cloud-computing provider. The hypervisor 12 facilitates the computer server 10A to execute one or more virtual machines 14A-14N, each virtual machine executing in its own logical partition (LPAR). Each of the virtual machines 14A-14N executes an instance of an operating system (OS). In some embodiments an instance of the virtual machine 14A and its corresponding OS can be considered a single entity. Accordingly, henceforth, in the present document, "OS" refers to both the instance of the OS and its corresponding virtual machine.

A client device 20A can request execution of a computer application that results in an instance of the computer application being executed in the OS 14A. Typically, the requested computer application is a "native" application, where, a "native" application is developed to be run on the OS 14A. The OS 14A provides the instances of the native computer applications in private users spaces 21A-21N with network I/O related functions through the physical hardware components of the physical NIC 11, which provides connectivity to the external network 165 (e.g. Ethernet). When the OS 14A receives a request to instantiate a native computer application, typically, the OS 14A deploys a private user (address) space 21H, which is one instance of the user spaces 21A-21N and initiates execution of an instance 19 of the requested native computer application in the private memory space associated with the user space 21H. In the case of the native application, the instance 19 is aware of the specifications for native APIs 17 providing network access of the OS 14, and as such the OS 14 can provide network communication between the instance 19 of the native application (native application instance) and the NIC 11 by encapsulating the applications data within standard IP packets. The native application instance 19 generates communications according to the native API specifications (e.g. sockets API) that are associated with the NIC 11 as per setup in the OS 14.

In this case, an instance of the native application 19 is aware of the network specifications of the OS 14, and as such the OS 14 can forward network communication between the instance of the native application 19 (native application instance) and the physical NIC 11 without any translations. The native application instance 19 uses native APIs 17, which causes a stack 1010A to generate communication packets according to the network specifications that are associated with the physical NIC 11 as per setup in the OS 14.

The network communication can be between the native application instance 19 and an external entity, such as the client device 20A or any other communication device external to the server cluster 5, such as another server. The OS 14 assigns an IP address that is typically a dynamic virtual IP address (DVIPA) to the user space 18N for network communication between the native application instance 19 and the external entity 20A.

A technical challenge exists for the OS 14A and/or an administrator of the OS 14A to host instances of "non-native" computer applications. A non-native application is an application that is not developed for the OS 14A, and rather is developed for executing on another OS (second OS), which is distinct from the OS 14A. In existing solutions, another virtual machine instance 14K has to be dispatched in the server cluster 5, the virtual machine 14K executing an instance of the second OS for executing the non-native computer application requested. The client 20A that requested the execution of the non-native application has to manage and pay for separate virtual machines in such cases. Further, in case the client 20A desires to coordinate data between instances of a native application and a non-native application, such separate virtual machines for the two applications can cause inefficiencies. In other existing solutions, the non-native application is executed within a virtual container. However, in such case, the virtual container is either not permitted to communicate via the external network 165 with communication devices such as client devices 20A-20C, or alternatively, if network communication is permitted, one or more services within the OS 14A can bind to the non-native application instance. Such binding with the non-native application can cause errors because of operation specifications of the non-native application being different from those of the OS 14A.

One or more embodiments of the present invention address such technical challenges and facilitate the OS 14A to provide an execution environment for a non-native application. One or more embodiments of the present invention further facilitate the non-native application to communicate with one or more external communication devices such as the client devices 20A-20C. According to one or more embodiments of the present invention the OS 14A is facilitate to execute such heterogeneous types of applications by using virtual container extended network virtualization.

As depicted in FIG. 3, the OS 14A deploys virtual containers (VC) 16A-16N. A virtual container 16H, from the virtual containers 16A-16N, executes an instance of the second OS (second OS instance 514) corresponding to the non-native application that is requested, i.e. the non-native application is "native" to the second OS. The second OS instance is "hidden" from the users and admin of the first OS, in other words, the users, native applications, services, and administrator of the OS 14A are unaware that the VC 16H hosts an instance of the second OS 514. The users only see the non-native application instance 18. Further, the VC 16H hosts an instance 18 of the non-native application (non-native application instance 18). It should be noted that the VC 16H can execute multiple instances of the non-native application. The multiple instances of the non-native application can be of the same non-native application or distinct non-native applications. The VC 16H is a virtual server with the second OS 514 executing the one or more instances 18 of the non-native application (for the OS 14). The second OS 514 is hosted in opaque manner, where the one or more native application instances, services, users, and/or administrators of the OS 14A are unaware of the second OS 514 in the VC 16H. The OS 14A allocates a DVIPA to the VC 16H and the OS 14A. The one or more embodiments of the present invention facilitate providing an "extended virtualization" to the non-native application instances 18 executing inside the virtual server, i.e. VC 16H, by the base OS 14A. Such extended virtualization is provided by implementing a modified DVIPA, a virtual NIC 13, an internal IP router 610, an internal fabric 620, and an internal IP route 622 for the modified DVIPA, as described further.

VCs 16A-16N are used in cloud computing systems, in which, by using operating system-level virtualization, the kernel of an operating system allows the existence of multiple virtual containers. Each of the VCs 16A-16N runs at least one instance of a software application. Compared to virtual machines (VMs) 14A-14N, VCs 16A-16N provide several advantages including higher speed of deployment and less required system resources. VCs 16A-16N (e.g., Docker containers) provide several advantages, such as enabling the clients 20A-20C to install and/or run more applications on a single computer server 10A than via using a VM. Also, a VC requires significantly less resources than a VM. For example, a VM requires not only a full copy of an operating system (unique to the VM), but also a virtual copy of all the hardware that the operating system of the virtual machine needs to run. In contrast, a VC only requires the base OS 14A (not a separate OS copy), supporting programs and libraries, and system resources of the computer server 10A without virtualization, to run a specific software program instantiated in the VC. Thus, a VC is usually Megabytes in size rather than the Gigabytes of a VM. Also, a VC can be deployed in milliseconds while a VM usually requires several seconds or even minutes to boot. Such and several other advantages of VCs over VMs are well documented.

The OS 14A includes a DVIPA engine 15. The DVIPA engine 15 provides various DVIPA services. A DVIPA is a VIPA that can be dynamically created, added, moved or deleted programmatically such as part of OS events, programmatic APIs, or operator (administrative) controls. Moving DVIPAs from one computer server 10A to another computer server 10B is used for fault tolerance, load balancing or other workload related or resource sharing functions. In one or more examples, the DVIPA engine 15 provides the set of services allowing DVIPAs to be dynamically created, moved and managed. The services are expanded across the server cluster 5 for load balancing. For example, if a number of DVIPAs allocated by the OS 14A of the computer server 10A exceed a predetermined maximum, one or more VCs 16A-16N can be relocated to another computer server 10B to free the DVIPAs associated with the VCs which are relocated.

The server cluster 5 facilitates the client devices 20A-20C to deploy one or more VCs 16A-16N. The VCs 16A-16N may be deployed in response to respective requests from distinct client devices 20A-20C. For example, the VC 16A may be deployed by the client device 20A, the VC 16B may be deployed by the client device 20B, and the VC 16C-16E may be deployed by the client device 20C, and the like.

In an example, the client devices 20A-20C may belong to the same entity, such as a person, a business, a government agency, a department within a company, or any other entity, and the server cluster 5 may be operated as a private cloud of the entity. In this case, the server cluster 5 solely hosts VCs 16A-16N that are deployed by the client devices 20A-20C that belong to the entity. In another example, the client devices 20A-20C may belong to distinct entities. For example, a first entity may own the client device 20A, while a second entity may own the client device 20B. In this case, the server cluster 5 may be operated as a public cloud that hosts VCs 16A-16N from different entities. It should be noted that the VCs 16A-16N are deployed in a shrouded manner in which the VC 16A cannot directly access data from the VC 16B, for example, without authorization from the VC 16B.

The container-based virtualization, also called operating system virtualization, facilitates the virtualization layer to run as an application within the OS 14A. When utilizing operating-system-level virtualization, the OS 14A kernel runs on the computer server 10A with multiple isolated user space containers, which are the VCs 16A-16N (e.g., memory where application software executes), installed on top that are simulated. A VC 16A includes an application engine, packaging infrastructure, and runtime libraries that allow the application software associated with the VC 16A to run. When a client device 20A accesses the VC 16A, the VC 16A responds and maintains the appearance of an actual computing device as the VC 16A incorporates features that limit, account for, and isolate the resource usage of a process and/or collection of processes (e.g., instance 18 of the non-native application being executed).

Figure 5:
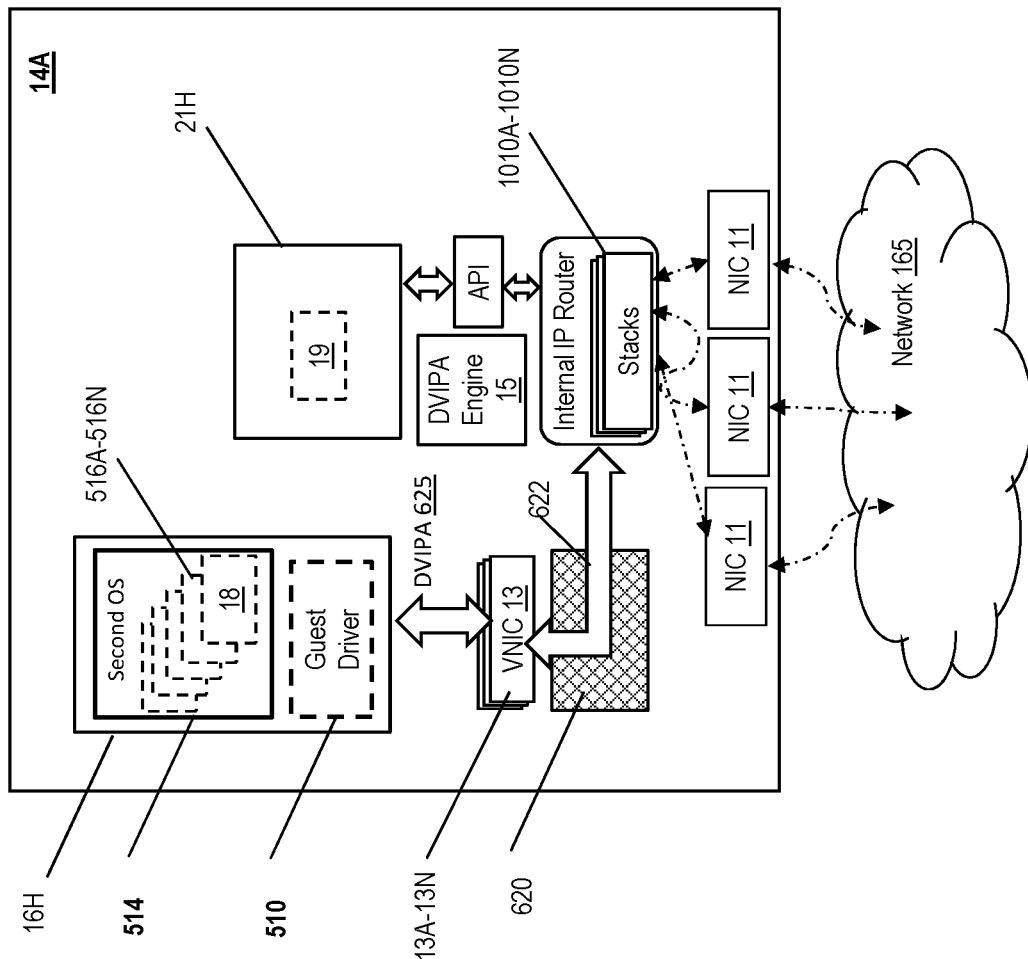
FIG. 5 depicts a block diagram of network virtualization in a computer server according to one or more embodiments of the present invention.

FIG. 5 depicts a block diagram of network virtualization in a computer server according to one or more embodiments of the present invention. The non-native application instance 18 is initiated in the VC 16H, in response to a request to execute the non-native application. In one or more embodiments of the present invention, the OS 14A to host non-native application instance 18 that cannot execute as a native application resident within the OS 14A by the hosting the second (hidden) OS 514 in the VC 16H by creating a virtual instance of another server. The second OS 514 can have different architecture and services compared to the OS 14A for running the non-native application instances 18 that do not typically execute natively on the OS 14A. For example, the second OS 514 can be instantiated using existing Linux container technologies (i.e. a hosted virtual server) coupled with native OS virtualization (i.e. virtual memory of address spaces) of OS 14A. As depicted, the virtual server created in the VC 16H can host multiple instances of virtual containers 516A-516N each with unique instances 18 of the application. For example, if two instances of the non-native application are requested, the OS 514 can deploy two VCs 516A and 516B in the virtual server 16H. The first VC 516A hosts a first instance 18 of the non-native application and the second VC 516B hosts a second instance 18 of the non-native application. Network communications forwarded to the VC 16H is directed by the second OS 514 to the appropriate VCs 516A and 516B.

This implementation creates a technical challenge regarding how the OS 14A can represent the network address (VIPA or DVIPA) associated with the VC 16H and still extend the existing eco-system using the DVIPA technology. The technical challenges include exposing an IP address (i.e. making available/accessible) to communication devices external to the server cluster 5 to enable network communication with the non-native application instance 18, without imposing any new or unique IP network requirements for finding, accessing, using or supporting the IP address of the non-native application instance 18. Further, the technical challenges include isolating ("fence off") the IP address associated with the non-native application instances 18 from the one or more internal services of the OS 14A, that is keeping the non-native application instances 18 isolated within the OS 14A.

One or more embodiments of the present invention address such technical challenges and facilitate the OS 14A to provide an execution environment for a non-native application in a manner that the non-native application can communicate with one or more external communication devices.

One or more embodiments of the present invention use distinct types of IP addresses for the VCs 16A-16N and the user spaces 21A-21N that host non-native and native application instances respectively. The user space 21H that hosts the native application instance 19 is allocated a typical DVIPA, whereas the VC 16H is allocated a unique type of application-instance DVIPA 625 that is recognized by an internal IP router 610 of the OS 14. The application-instance DVIPA 625 is visible to the external communication devices, however, it is invisible to services and applications inside the OS 14A, and yet eligible for all the existing services provided for DVIPAs by the OS 14A. The VIPA is configured in the same way as a typical application instance DVIPA, except that the VC DVIPA are designated with a new DVIPA attribute "VC DVIPA". To an attached router, the internal IP router 610 of the OS 14A is like another router.

In one or more examples, externally the application-instance DVIPA 625 of the VC 16H appears to be a typical DVIPA, while internally (within the OS 14A) the IP address 625 of the VC 16H has a new attribute providing special "fencing" or isolation. The attribute, in one or more examples, is referred to as "VC DVIPA" attribute, however, it can be named anything else without limiting one or more embodiments of the present invention. Based on the attribute being marked, the one or more services of the OS 14A provide a level of dynamic VIPA control, protection and isolation, distinct from the typical DVIPA of the user space 21H. Yet, the OS 14A extends all the platform management capabilities and services available to the application-instance DVIPA 625 of the VC 16H hosting the non-native application instance 18.

Within the OS 14A and in the surrounding DVIPA eco-system the VC DVIPA attribute creates a unique set of controls providing limited visibility, which fences off the DVIPA 625 of the VC 16H from access from other native OS services, resources, native applications and other various or related functions. Such fencing prevents native applications from seeing the DVIPA 625 of the VC 16H. The fencing further prevents the native applications of the OS 14A from binding to or using the DVIPA 625 that has the VC DVIPA attribute turned on.

Accordingly, in one or more embodiments of the present invention, the OS 14A implements a network virtualization model, or an IP address virtualization model, in which the DVIPA 625 appears to be associated with or within an instance of the OS 14A, yet within the OS 14A, the visibility of the DVIPA 625 is limited, tightly restricted, and controlled. Yet, the extensive platform administrative capabilities for managing DVIPAs (creating, including cloud based creation), moving, monitoring, deleting, etc.) that are provided by the DVIPA engine 15 are extended to such application-instance DVIPAs 625 that has the VC DVIPA attribute turned on.

Further, the OS 14A provides unique internal routing (i.e. internal IP Route 622) from a communication protocol stack 1010A to the application-instance DVIPA 625 that has the VC DVIPAs turned on. Within the OS 14A an administrator cannot define, create, or alter the internal IP route 622 that is created for or directly to the application-instance DVIPA 625. The IP route 622 is restricted and controlled by the communication stack 1010A of OS 14A.

Referring to FIG. 5, the depicted network virtualization implemented by the OS 14A uses at least three components, a guest driver 510, a VNIC 13, and access to the set of physical NICs 11. The diagram shows the VC 16H with the second OS 514 and a non-native application instance 18 of a computer application that is being executed in the VC 16H. The network virtualization is performed so that the application instance 18 can communicate through any physical NICs 11 available to the base OS 14A with the client device 20A, or any other communication device outside the server cluster 5 via the network 165.

In existing solutions, one way of implementing network virtualization can be performed using a "network hardware abstraction model", in which the guest driver 510 is unaware of the actual underlying details of the physical NIC 11 hardware or in some cases the guest driver 510 is unaware of the type of network 165 itself (medium such as Ethernet, InfiniBand etc.). As such, the guest driver 510, which is provided by the OS 14A, in turn provides an I/O application programming interface (API) to provide the non-native application instance a set of basic capabilities. In this way, the non-native application instance 18 in the VC 16H is typically not involved with building the actual network frames or media headers (unaware) or using low level hardware functions (e.g. TCP/IP chksum offload). In one variation of the network hardware abstraction model, the non-native application instance 18 is provided access to a subset of the hardware features without having access to all of the hardware features.

In existing solutions, one way of implementing network virtualization is achieved by using a "pass through model" in which the guest driver 510 is fully aware of the actual underlying NIC 11 hardware. In this case, the guest driver 510 passes through the OS 14A for a more direct approach in communicating with the physical NIC 11. In this model, the guest driver 510 has full access to all hardware functions/features of the physical NIC 11 and is fully aware of the underlying medium of the network 165 just as if the guest driver 510 has the associated hardware in "dedicated mode". In this model, the guest driver 510 can exploit (is responsible for) the "Layer 2" functions such as broadcast or multicast etc. and can exploit various off-loads.

In yet other examples, the network virtualization is achieved by using a virtual switch/bridge model. In this case, the OS 14A provides a VNIC 13 that allows multiple VCs 16A-16N to connect to an internal IP switch/router 610, and in turn to connect to the external network via the NIC 11 while gaining advantages of an (internal) switched model. In this example, the VC 16H typically uses a form of the abstract model to connect to the VNIC 13, which in turn converts commands/network communication between the VCs 16A-16N and the physical NIC 11. Typical examples of this transformation could use network address translation (NAT) or various forms of IP tunnels, which can be costly and complex.

The internal IP router 610 can include one or more communication protocol stacks 1010A-1010N, for example TCP/IP stacks. When the internal IP router 610 receives a packet destined for one of its VIPAs, the inbound IP function of a stack 1010A from the stacks 1010A-1010N notes that the IP address of the packet is in the stack's list of supported VIPAs and passes the packet up the stack 1010A. Each stack can support a subset of VIPAs allocated by the internal IP router 610. Assuming the stack 1010A has multiple adapters or paths to it (including z/OS Cross-system Coupling Facility (XCF) from other TCP stacks in the server cluster 5), if a particular physical adapter fails, the attached routing network routes the VIPA-targeted packets to the stack 1010B using an alternate route.

The VIPA can be configured to be supported by another stack within the same OS 14A, or to OS 14B of another computer server 10B in the server cluster 5. Such a configuration can be a manual process, but this requires the presence of an operator or programmed automation. The DVIPA engine 15 enables DVIPAs to be moved without human intervention or programmed automation to allow new connections to the computer server 10A at the same IP address. This can reduce downtime significantly. With Dynamic VIPA takeover one or more TCP/IP stacks in the OS 14A are configured to be backups (e.g. using a VIPABACKUP command in z/OS®) for a particular DVIPA. If the stack where the DVIPA is active is terminated, one of the backup stacks automatically activates that DVIPA. The existing connections will be terminated but can be quickly reestablished on the stack that is taking over.

However, implementing any one of the above network virtualization models is not feasible in the case of the OS 14A. This is because, the OS 14A can include the VC 16H that may instantiate the second OS 514 to execute the non-native application instance 18, and further include the user space 21H that includes the native application instance 19. The VC 16H and the user space 21H, require different types/level of virtualization. In other words, the OS 14A provides instances of heterogeneous types of applications via the VCs 16A-16N and user spaces 21A-21N without adding or requiring instances of virtual machines even in case of heterogeneous applications (guests). This facilitates extending the capabilities of the OS 14A to the hosted applications in the VCs 16A-16N and the user spaces 21A-21N and providing an execution environment for both native and non-native applications. The external entities, from outside the server cluster 5, that are communicating with the hosted applications are to be kept unaware of the implementation distinction between the native and non-native applications. For the external entities, such as the clients 20A-20C, they simply connect, communicate, and interact with the non-native application instance 18 just as they can with the native application instance 19 that is hosted by the OS 14A.

Such technical challenges are also addressed by one or more embodiments of the present invention as described herein using a hybrid network virtualization model. For the OS 14A to transparently host the native and non-native application instances, the OS 14A has to provide the hosted (non-native) applications with access to all of the network resources and services that are provided to native applications. For example, such network resources and services include access to the DVIPA, IP routes, IP filters, IP Security, IP interfaces, policies, and quality of services, along with access to all internal and external networks and the underlying available NICs 11 provided by the computer server 10A. For this to work, the hybrid network virtualization model exposes an extensive set of network services and interfaces to the VIRTUAL container 16H. The hybrid network virtualization model also makes the non-native application instance 18 appear similar to a native application instances by extending all services to the non-native application instance 18.

One existing solution to provide such features is to expose a single interface or NIC 11 or a limited set of interfaces and then use various forms of a proxy, network translation techniques, such as encapsulation, tunneling, network addressing translation (NAT), and the like. The existing solution imposes several limitations (e.g. tunnel through specific interface only) and are too restrictive (e.g. access to a single IP interface) and can be too expensive (processing cost for adding and removing encapsulation) and complex (translation coordination among base servers can cause administrative overhead).

One or more embodiments of the present invention address the technical challenges by facilitating the hybrid network virtualization model in which the non-native application instance 18 is treated substantially like the native application instance 19, but the non-native application instance is within the "hidden" server hosted by the VC 16H that appears to be (one IP hop) behind the base OS 14A. This is provided without allowing the DVIPA 625 of the VC 16H from being externally visible (externally only the base OS 14A is seen). Accordingly, one or more embodiments of the present invention provide each VC 16H that hosts a non-native application instance 18 with a corresponding VNIC 13H. The VNIC 13H for the VC 16H includes a complete IP stack. The user space 21H that hosts native application instance 19 does not have such a VNIC instance.

Figure 6:
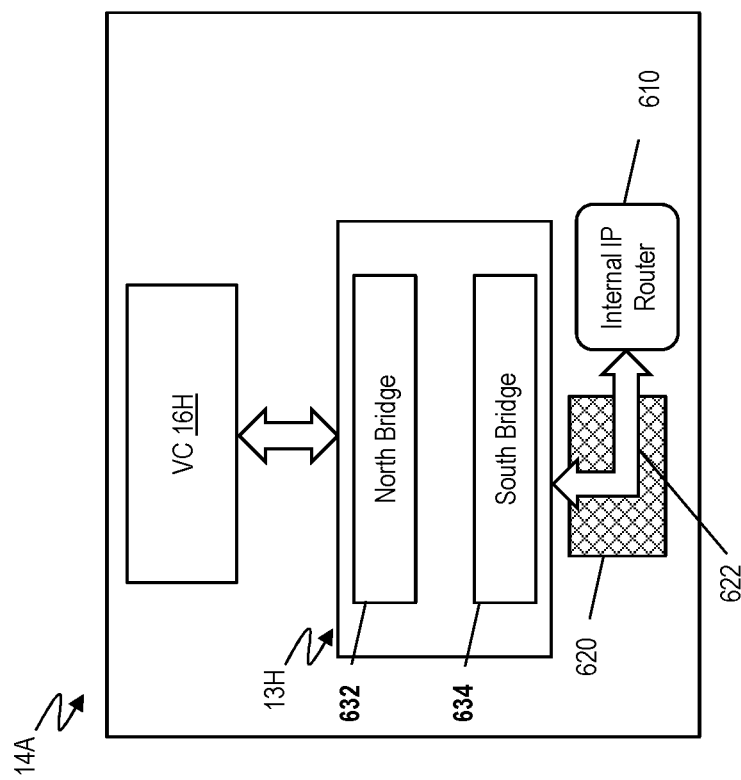
FIG. 6 depicts a block diagram of one or more components of a virtual network interface card according to one or more embodiments of the present invention.

FIG. 6 depicts a block diagram of one or more components of a virtual network interface card according to one or more embodiments of the present invention. The VNIC 13H hides the underlying network hardware, physical NIC 11, from the VC 16H. Instead, the VNIC 13H transparently provides direct access to the OS 14A, which provides the internal IP router 610. The VNIC 13H accordingly provides the network services to the non-native application instance 18 in the VC 16H. The base network services include management of virtual IP address, IP routes, IP security, IP filters, IP interfaces, and access to one or more NICs 11 in the computer server 10A. This approach avoids using a proxy, NAT, tunneling or other encapsulation approaches and accordingly avoids driving up complexity and cost. The OS 14A further provides management of an internal fabric 620 that facilitates creating and managing the internal IP route 622 for passing data between the IP router 610 and the VNIC 13H uniquely associated with the VC 16H.

The OS 14A, to implement the hybrid virtualization model, creates the VNIC 13H unique to the VC 16H. In other words, each VC 16H that hosts a non-native application instance 18 is associated with a corresponding VNIC 13H. The VNIC 13H can communicate with the VC 16H and create a unique internal connection with access to the internal IP fabric 620. The VNIC 13H provides translations between two environments, the VC 16H and the OS 14A, over two interfaces, a north bridge 632 and a south bridge 634.

The north bridge 632 is exposed to and accessed by the VC 16H conforming to existing requirements and specifications of virtual I/O standards and operations that are specific to the VC 16H. In one or more examples, the I/O standards are those of the second OS 514 that is instantiated in the VC 16H. The details of the base OS 14A, such as architecture and specifications of the OS 14A, are hidden from the VC 16H. The VC 16H only sees the north bridge 632 as a first hop (or the external network) and is unaware of the details of any next hops, such as connections to native applications, physical NIC 11, and the like.

The south bridge 634 is exposed to and accessed by the base OS 14A conforming to the existing specifications of the I/O standards and operations of the OS 14A. The south bridge 634 has direct access to the physical NIC 11 by way of the internal fabric 620, which is an IP Layer 3 fabric (exchanging IP packets). The physical NIC 11 reaches the VC 16H over the internal fabric 620 with the internally created and managed IP route 622. The IP fabric 620 reaches the base OS 14A and hence is able to use the networking features provided by the base OS 14A.

Further, the OS 14A creates and manages the internal IP fabric 620 that includes one or more paths for transferring data from the physical NIC 11 to the VC 16H. The internal layer fabric 620 is a point to multi-point fabric that provides a network transport between the physical NIC 11 and the VC 16H.

Further, the OS 14A creates and controls the unique internal IP route 622 in the internal fabric 620. The internal IP route 622 identifies one or more hops for transferring data from the NIC 11 to the VC 16H, and particularly the non-native application instance 18 in the VC 16H. The OS 14A creates internal IP routes 622 from the physical NIC 11 to each VC 16A-16N. The internal route 622 allows external IP traffic to flow to the VC 16H using IP forwarding, without requiring/enabling datagram forwarding (i.e. uses internal IP forwarding). The internal IP route 622 to the VC 16H is dynamically created and controlled by the OS 14A, and it cannot be altered by other IP route configuration processing, such as administrative commands, static definitions, or dynamic protocols.

It should be noted that the computer server 10A can include one or more physical NICs 11 that receive and transmit the data from respective network 165 that is external to the server cluster 5.

Figure 7:
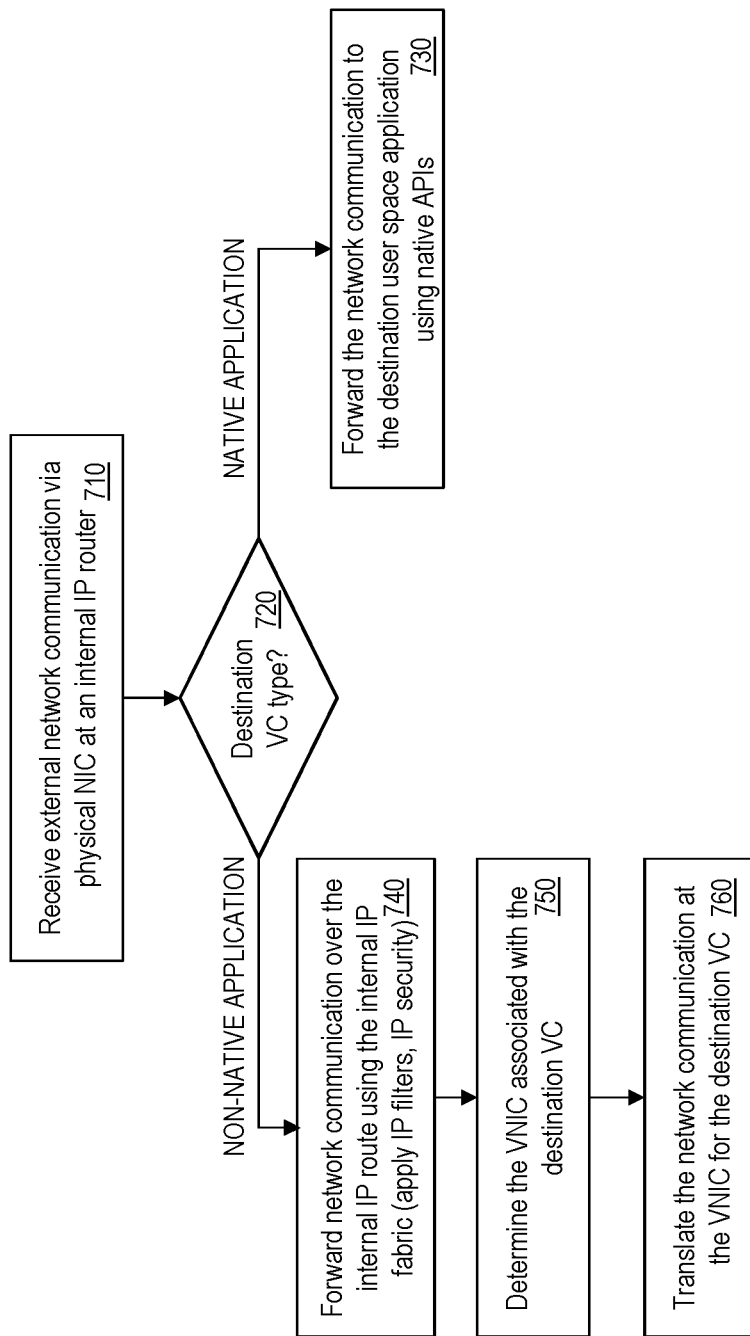
FIG. 7 depicts a flowchart of a method for network communication in an operating system that hosts both native and non-native applications using virtual containers according to one or more embodiments of the present invention.

FIG. 7 depicts a flowchart of a method for network communication in an OS that hosts both native and non-native applications using VCs according to one or more embodiments of the present invention. The OS 14A of the computer server 10A operates an internal IP router 610 that receives external network communication via the physical NICs 11, at 710. The internal IP router 610 determines a type of destination for the network communication based on a destination IP address associated with the network communication that is received, at 720. The destination IP address can be for the VC 16H that hosts the non-native application instance 18, or for the user space 21H that hosts the native application instance 19. The destination IP address from the received communication is checked in the internal router 610 for the VC DVIPA attribute to determine the type of the destination VC for the communication. If the VC DVIPA attribute is marked off, the destination is deemed to be the user space 21H hosting a native application instance 19. If the VC DVIPA attribute of the destination IP address is marked on, the VIPA is deemed to be for the VC 16H hosting the non-native application instance 18.

In case the network communication is for the native application instance 19, the internal IP router 610 forwards the communication directly to the user space 18H that hosts the native application 19, at 730. The user space 18H is assigned a DVIPA by the OS 14 at the time the user space 18H was allocated to instantiate the native application instance 19.

In case the network communication is for the non-native application instance 18, the internal IP router 610 identifies the VNIC 13H that is uniquely associated with the VC 16H, which hosts the non-native application instance 18. The internal IP router 610 stores the mapping between the VNICs 13A-13N and the DVIPAs 625 of the VCs 16A-16N. The VC 16H is allocated a DVIPA 625 at the time the VC 16H is deployed and the VNIC 13H is uniquely associated with the VC 16H at the time it is deployed to host the non-native application 18. The internal IP router 610 forwards the network communication to the VNIC 13H through the internal fabric 620 and via the internal IP route 622, at 750. Forwarding the network communication includes applying one or more IP filters or IP security protocols, such as based on one or more network/security policies setup for the OS 14A. For example, the IP filtering can include applying firewall settings.

The VNIC 13H includes the north side bridge 632 that provides a generic API for the non-native application 18 to access network data. In one or more examples, the north bridge 632 is an implementation agnostic API that is unaware of the hardware/software platform details of the OS 14A and/or the computer server 10A. In addition, the VNIC 13H includes OS-specific south bridge 634 that is specific for the OS 14A. In other words the south bridge 634 understands and manages the network specifications and details of the OS 14A. Accordingly, the VNIC 13H translates the network communication received from the internal IP router 610 for the VC 16H, at 760. The translation includes a first translation by the south bridge 634 according to specifications of the OS 14A, and a second translation to generic network communication packets according to the north bridge 632 for forwarding to the non-native application instance 18.

Figure 8:
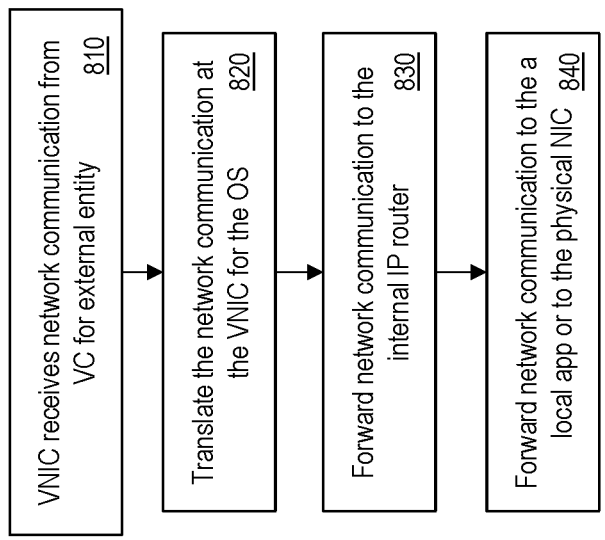
FIG. 8 depicts a flowchart of a method for network communication in an operating system that hosts both native and non-native applications using virtual containers according to one or more embodiments of the present invention.

FIG. 8 depicts a flowchart of a method for network communication in an OS that hosts both native and non-native applications using VCs according to one or more embodiments of the present invention. Here, the method depicts the case of communication from the non-native application instance 18 to an external entity, which can be any communication device external to the server cluster 5, such as the client device 20A. Alternatively, or in addition, in one or more examples, the non-native application instance 19 hosted by the VC 16H can communicate with a native application instance 18 (instead of or in addition to the external clients). That is the forwarding layer recognizes that the target is actually this OS 14A instance (a local native app). The above operations in case of FIG. 7 are performed substantially in reverse order. The communication packets from the non-native application instance 18 in the VC 16H are received by the corresponding VNIC 13H, at 810. The network communication packets are received by the north bridge 632 of the VNIC 13H via the generic API. The packets are translated by the south bridge 634 as per specifications of the OS 14A, at 820. The translated communication packets are forwarded to the internal IP router 610 via the internal IP route 622 in the internal fabric 620, at 830. The internal IP router 610 further forwards the communication packets to a local native app or to the physical NIC 11 for transmitting the packets via the external network 165 to the external entity intended by the non-native application instance 18, such as the client device 20A, at 840. Forwarding the packets by the physical NIC 11 can include applying one or more IP filters and IP security protocols to the communication packets.

Accordingly, the OS 14A can host native applications 19 and non-native applications 18 using VCs 16A-16N and user spaces 21A-21N. In addition to having access to the services of the OS 14A, the non-native applications 18 that are hosted by the OS 14A can benefit from the services provided by the server cluster 5. For example, services such as load balancing, fault tolerance, and the like, are extended to the non-native applications 18. The DVIPA 625 of the VC 16H that hosts the non-native application instance 18 can be moved from the computer server 10A to another computer server 10B, and the Layer 3 connectivity automatically follows (can be reestablished) the VC 16H to the new instance on the computer server 10B. The virtualized network of the VC 16H does not require any form of tunneling, encapsulation or NAT for such a move.

Figure 9:
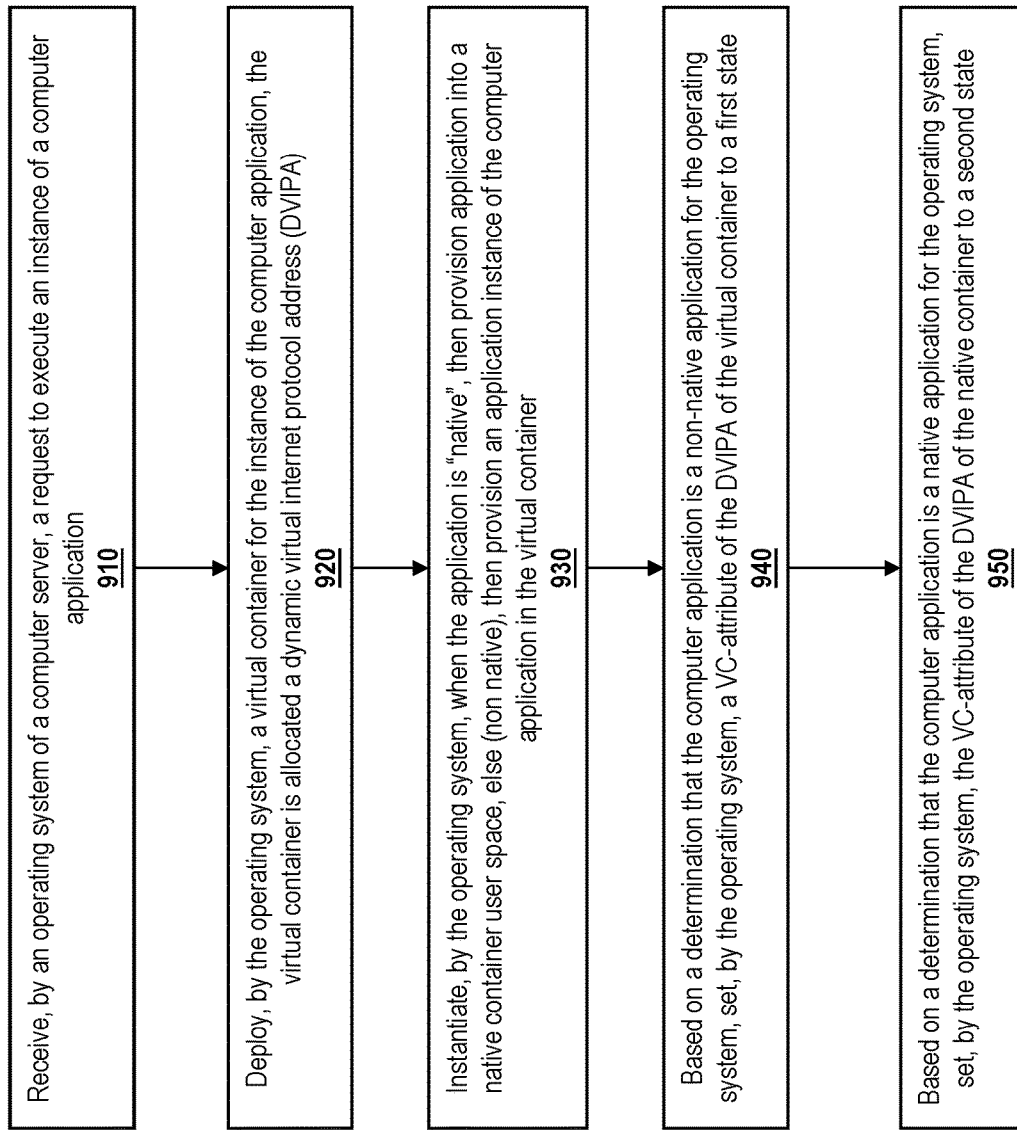
FIG. 9 depicts a flowchart of a method for hosting application instances in an operating system according to one or more embodiments of the present invention.

FIG. 9 depicts a flowchart of a method for hosting application instances in an OS according to one or more embodiments of the present invention. The method includes receiving, by the OS 14, a request to execute an instance of a computer application, at 910. The OS 14 deploys a VC 16H for the instance of the computer application, at 920. Deploying the VC 16H includes the DVIPA engine 15 creating and allocating a dynamic virtual internet protocol address (DVIPA) 625 to the VC 16H. The VC 16H further instantiates the second OS 514 for which the computer application is developed.

The method further includes instantiating, by the OS 14A, an application instance of the computer application in, at 930. Instantiating the computer application includes the OS 14A checking a type of the computer application, whether the computer application is a native application or a non-native application.

If the computer application is a native computer application, the instance 19 of the computer application is created in a "native container" aka user space 18H. The native container differs from the virtual container 16H where the user space does not have attributes that are associated with a virtual container, such as the VNIC, internal IP route, internal fabric, among others. Further, the native container 18H includes a single instance 19 of the computer application, whereas the virtual container 16H can include multiple instances 18 of the computer application. In case the computer application is a non-native computer application, the instance is created in the VC 16H. The native container 18H and/or the virtual container 16H is allocated a DVIPA 625 by the internal router 610.

Based on a determination that the computer application is a non-native application, the OS 14A sets a virtual container (VC)-attribute of the DVIPA 625 of the VC 16H to a first state (for example, ON), at 940. In one or more examples, the first state of the VC-attribute is indicative that the VIPA is allocated to a virtual container that is hosting an application instance of the non-native application. In one or more examples, setting the VC-attribute to the first state further includes storing the DVIPA 625 in a routing table of the internal IP router 610. The OS 14A can check the status of the VC-attribute in the routing table when determining a type of a VIPA during network communication.

Further, setting the VC-attribute to the first state can include creating the VNIC 13H corresponding to the VC 16H. Further, setting the VC-attribute to the first state can include creating and recording the internal IP route 622 to the VNIC 13H in the routing table.

Alternatively, based on a determination that the computer application is a native application, the OS 14A sets the VC-attribute of the DVIPA 625 of the VC 16H to a second state (for example, OFF), at 950. Here the ON and OFF state can be indicated by value of a bit, a byte, a nibble, or using any other techniques. For example, ON=1, and OFF=0. It is understood that other values can be used to indicate the first and second state of the VC-attribute of the DVIPA 625.

One or more embodiments of the present invention are rooted in computer technology, particularly virtual machine hosting computer servers. Further, one or more embodiments of the present invention facilitate an improvement to the operation of computing technology itself, in particular virtual machine hosting computer servers, by facilitating the hosting computer servers to host native and non-native applications using virtual containers, and without instantiating virtual machines. Accordingly, the computer server can host heterogonous applications and larger number of application instances compared to existing solutions that require instantiating virtual machines instead, which require more compute resources and are slower than using virtual containers as described herein.

Accordingly, in one or more embodiments of the present invention, the hybrid network virtualization facilitates an improved server cluster with capability for dynamically creating, moving, and deleting a dynamic VIPA of the VCs 16A-16N among multiple communication protocol stacks 1010A-1010N and OS instances of the one or more computer servers 10A-10N. Eventually, the VIPA is instantiated (supported) by or registered within a single OS instance and stack in the server cluster 5. A technical challenge introduced is that the timing of this VIPA movement and the virtual server activation cannot always be coordinated or synchronized. As noted earlier, here, "virtual server" refers to the VC 16H that is hosting a non-native application instance 18. When the OS 14A supports socket programming to allow one or more services to communicate with the VC 16A, such as using programming protocols like INET, common INET (CINET) etc., there can be multiple providers of the TCP/IP protocol that can support the VIPA of the VC 16A. For example, the OS 14A may include multiple communication protocol stacks, such as TCP/IP stacks, that are connected with the VIPA. Additionally, any OS 14A in the server cluster 5 can contain a provider of the TCP/IP protocol in connection with the VIPA. Therefore, which TCP/IP stack and/or which OS 14 is supporting the VC 16H has to be determined for forwarding network communication to the VC 16H. Particularly, such determination is required when the VC 16H is deployed, and/or is moved from the computer server 10A. In other words, when the virtual server 16H (that host the VCs) starts, it must bind with a communication protocol stack, and finding the appropriate stack and OS instance for the virtual server 16H is a technical challenge.

Such technical challenges are addressed by one or more embodiments of the present invention by facilitating the VNIC 13H to dynamically poll, find and wait (when necessary) for the correct communication protocol stack to support the VIPA assigned to the corresponding VC 16A and accordingly associate the VC 16H with the identified stack.

Figure 10:
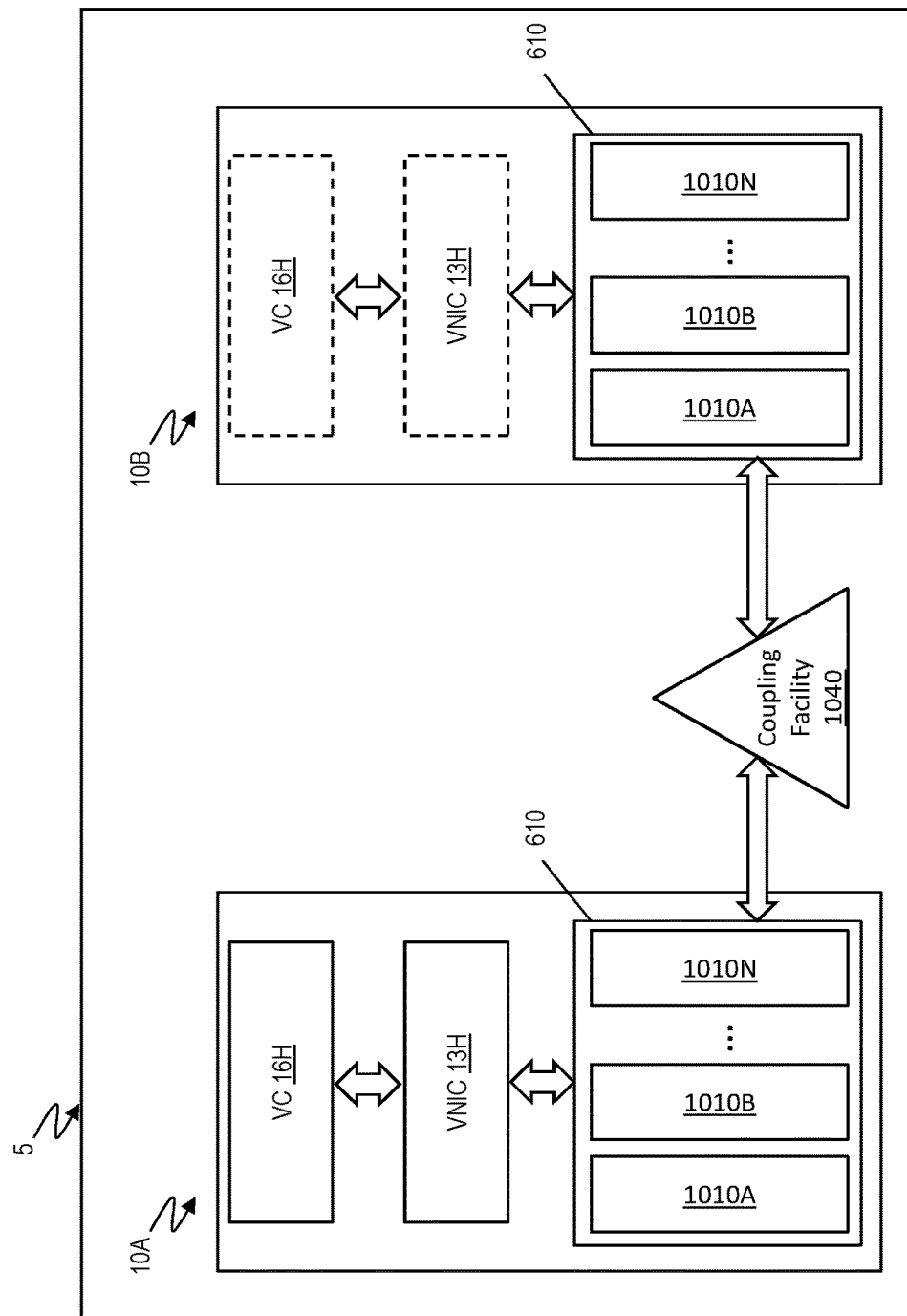
FIG. 10 depicts a block diagram of a server cluster that facilitates associating a VIPA of a virtual container with an appropriate operating system (OS) in the server cluster according to one or more embodiments of the present invention.

FIG. 10 depicts a block diagram of a server cluster that facilitates associating VIPA of a virtual container with appropriate OS in the server cluster according to one or more embodiments of the present invention. For simplicity, a partial view of the server cluster 5 is depicted with only the computer servers 10A and 10B. However, it is understood that the server cluster 5 can include different number of computer servers than those depicted in the exemplary figures herein. The internal IP router 610 includes the multiple communication protocol stacks 1010A-1010N, such as TCP/IP stacks.

The communication protocol stacks 1010A-1010N communicate with each other through a coupling facility 1040 of the server cluster 5, for example, utilizing XCF messaging. Furthermore, the communication protocol stacks 1010A-1010N communicate with external entities, such as the client devices 20A-20N or other communication devices via the external network 165.

Consider that at the time the VC 16H was deployed on the computer server 10A, the DVIPA allocated to the VC 16H is associated with the communication protocol stack 1010A. Utilizing the above described system configuration as an example, the VIPA distribution function 1013 with cluster-wide port assignment and/or source IP address selection will now be described. The VIPA distribution function 1013 allows for protocol stacks which are defined as supporting DVIPAs to share the DVIPA and communicate with the network 165 through a routing protocol stack such that all protocol stacks having a server application which is associated with the DVIPA will appear to the network 165 as a single IP address. Such dynamically routable VIPAs may be provided by designating a protocol stack, such as protocol stack 1010B, as a routing protocol stack, notifying other protocol stacks of the routing protocol stack and having other protocol stacks notify the routing protocol stack when an application which binds to the DVIPA is started.

The communication protocol stacks 1010A-1010N may be configured as to which stacks are routing stacks, backup routing stacks and server stacks. Different DVIPAs may have different sets of backup stacks, possibly overlapping. For dynamic VIPAs tied to VCs 16A-16N, configuration will limit the specific values of the IP addresses of the dynamic VIPAs that may be started, so that a keying error in configuring a dynamic VIPA will not attempt to start an IP address that is not available to the installation or the organization. Within the constraints defined by customer configuration of the TCP/IPs in the server cluster 5, however, there is complete freedom in initial placement and movement of VCs 16A-16N.

Because the dynamic VIPA is specific to the VC 16H, which may have unique data or state, if the VC 16H is restarted elsewhere, the dynamic VIPA has to move along with it to a stack on the OS 14 on the new computer server 10B. Typically, such a BIND( ) is successful only if the specified IP address is active on the communication protocol stack to which the application instance 18 issues the BIND( ). The VIPA Takeover function 1013 enhances the communication protocol stacks 1010A-1010N such that if the IP address is not in use on another communication protocol stack, and the communication protocol stack has been so configured, a dynamic VIPA will be activated on the target communication protocol stack. "In use" as used herein refers to active connections to that IP address on a communication protocol stack.

Because the communication protocol stacks 1010A-1010N exchange information about active IP addresses (including Dynamic VIPAs), the determination of whether a dynamic VIPA is in use can be made fairly quickly. If the dynamic VIPA is in use on another communication protocol stack, or the target communication protocol stack has not been configured to accept this particular request, the BIND( ) can fail with ENOADDR EADDRNOTAVAILBLE as it would for communication protocol stacks without the VIPA Takeover function 1013.

The dynamic VIPAs to be activated in this manner can be grouped into subnets of their own. As an example, the VIPAs for instances of Application APP A can be grouped into one subnet with network prefix (subnet address) SN1 and address mask SNAM1, and similarly for Application APP B. A subnet could be defined for all applications, or a different subnet for each application, or combinations thereof Once activated on a communication protocol stack via BIND( ) a dynamic VIPA remains active until the activating application instance 18 terminates (address automatically deactivated by TCP/IP) unless the dynamic VIPA is moved to another stack. The system operator may delete an active dynamic VIPA by issuing a VIPADELETE command referencing the specific dynamic VIPA. When the VIPADELETE statement is processed, the dynamic VIPA is deactivated and deleted from the communication protocol stack. If the dynamic VIPA was activated by a BIND( ), it will not be activated automatically on another communication protocol stack until an application instance issues a BIND( ) to the same address at the other communication protocol stack.

The definition of backup stacks may be the same as that for the VIPA takeover function described in U.S. patent application Ser. No. 09/401,419, entitled "METHODS, SYSTEMS AND COMPUTER PROGRAM PRODUCTS FOR AUTOMATED MOVEMENT OF IP ADDRESSES WITHIN A CLUSTER" which is incorporated herein by reference as if set forth fully herein.

Configuration of a dynamic routable VIPA may be provided by a definition block established by a system administrator for each routing communication protocol stack 1010A-1010N. Such a definition block is described in the above referenced United States Patent Application and defines dynamic routable VIPAs for which a communication protocol stack operates as the primary communication protocol stack. Backup protocol stacks may be defined as described for the VIPA takeover procedure. In one or more examples, the definition block "VIPADynamic" may be used to define dynamic routable VIPAs. Within the VIPADynamic block, a definition may also be provided for a protocol stack supporting moveable VIPAs. All of the VIPAs in a single VIPADEFine statement should belong to the same subnet, network, or supernet, as determined by the network class and address mask. VIPAs may also be defined as moveable VIPAs which may be transferred from one communication protocol stack to another.

Similarly, within the definitions, a protocol stack may be defined as a backup protocol stack and a rank (e.g. a number between 1 and 254) provided to determine relative order within the backup chain(s) for the associated dynamic routable VIPA(s). A communication protocol stack with a higher rank will take over the dynamic VIPAs before a communication protocol stack with a lower rank.

Within the VIPADYNamic block, a VIPA may be defined as a dynamic routable VIPA based on a VIPA address and a port list, which is a list of ports for which the DVIPA will apply. Alternatively, all ports may be considered to be usable for workload distribution when used with a dynamic routable VIPA. Also provided in the definition is a list of protocol stacks which will be included as server stacks in routing communications directed to the DVIPA. The IP addresses which define the potential server stacks may be XCF addresses of the protocol stacks or may be designated "ALL." If "ALL" is designated, then all stacks in the server cluster 5 are candidates for distribution. This may include future stacks which are not active when the routing stack is initialized. Thus, if ALL is specified, a protocol stack may be added to the DVIPA without disruption of operations and without user intervention to redefine the stack in the VIPA-Dynamic block. In addition to the above definitions, a range of IP addresses may be defined as DVIPAs utilizing the VIPARange definition. At initialization or profile changes, the communication protocol stacks 1010A-1010N communicate to partner communication protocol stacks the complete list of dynamic routable VIPAs, their associated potential servers and list of ports and the primary and backup definitions for the communication protocol stack.

When a communication protocol stack 1010A-1010N receives the DVIPA information it notes if it is identified as a candidate target protocol stack or as a backup stack. If the receiving communication protocol stack is a candidate target stack, it monitors its applications and sends a message to the defined routing stack when an application instance is bound to the DVIPA and listens on a defined port. If the receiving communication protocol stack is a backup stack, it stores the DVIPA information for use in the event of failure of the primary routing stack.

Typically, the request to deploy the VC 16H includes a specification as to which communication protocol stack to BIND( ) and/or what IP address to use. However, depending on availability of the communication protocol stack and/or the IP address, the VC 16H may or may not receive the requested configuration.

In one or more embodiments of the present invention the VNIC 13H that is uniquely associated with the VC 16H identifies, from among the various communication protocol stacks 1010A-1010N, an instance which provides optimal IP routing support for the non-native application instance 18. The VNIC 13H uses the one or more configuration parameters provided in the VIPARANGE statement for the VC 16H. When there are multiple stacks this can be performed dynamically and therefore does not require the issuer to specify a communication protocol stack name. If an active base networking stack cannot be found, then a wait and re-attempt scheme is performed before attempting to locate the DVIPA 625. This allows for scenarios where a communication protocol stack may be in the process of activation at the time the dynamic VIPA is created. If a communication protocol stack cannot be found on this OS 14 instance, then XCF messaging can be utilized to extend this search to the computer server 10B to check if the communication protocol stack associated with the VC 16H is on that computer server 10B. One or more embodiments of the present invention, accordingly, along with finding the stack that is supporting the VNIC DVIPA 625, facilitate dynamically creating and deleting a new VNIC. In one or more examples, the VNIC creation and deletion is performed using an interface such as the IOCTL interface in z/OS®.

Figure 11:
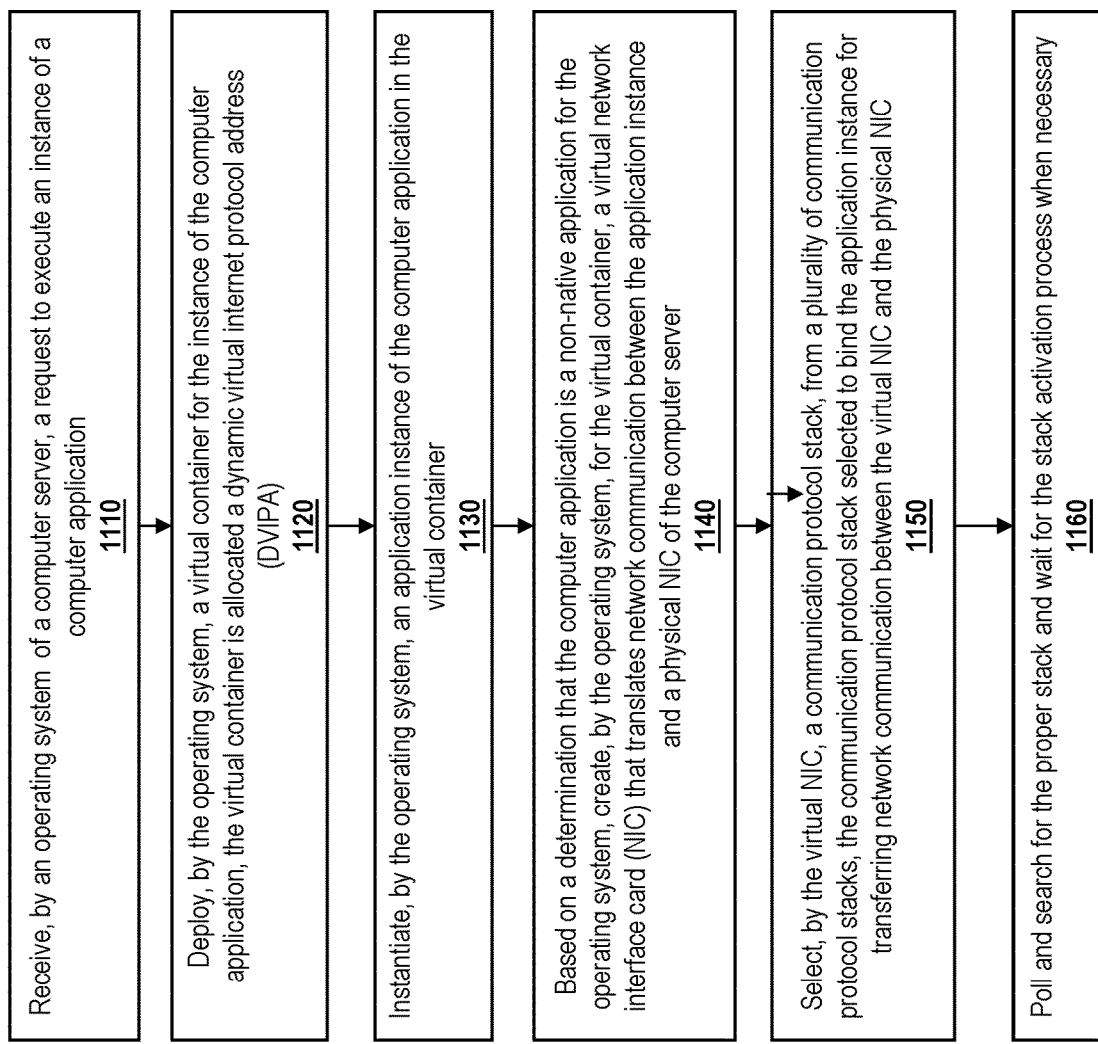
FIG. 11 depicts a flowchart for a method for associating a VIPA of a virtual container with an appropriate OS in the server cluster according to one or more embodiments of the present invention.

FIG. 11 depicts a flowchart for a method for associating VIPA of a virtual container with appropriate OS in the server cluster according to one or more embodiments of the present invention. The method includes receiving, by the OS 14, a request to execute an instance of a computer application, at 1110. The OS 14A deploys, in response, the VC 16H for the instance of the computer application, 1120. The VC 16H is allocated a dynamic virtual internet protocol address (DVIPA) 625. Further, the OS 14A instantiates an application instance of the computer application in the VC 16H, 1130.

If the instantiated computer application is a non-native application for the OS 14A, the OS 14A creates, specifically for the VC 16H, the VNIC 13H, at 1140. The VNIC 13H translates network communication between the application instance 18 in the VC 16H and the physical NIC 11 of the computer server 10A. The VNIC 13H selects a communication protocol stack from the set of communication protocol stacks of the OS 14, at 1150. The communication protocol stack is selected to bind the application instance 18 from the VC 16H for transferring network communication between the VNIC 13H and the physical NIC 11. In one or more examples, the VNIC 13 selects the communication protocol stack from the set of communication protocol stacks from the OS 14 of another computer server 10B.

For the selection of the communication protocol stacks, the administrator predefines a set of new VC DVIPAs 625, (e.g. VC DVIPAs A, B and C) that can be defined on multiple communication protocol stacks 1010A-1010N and instances of OS 14A-14N. The OS administrator determines which OS instances are to host which VCs 16A-16N. The OS 14A administrator activates a specific VC 16B with DVIPA 'B' on stack Y in the OS 14A. At a later time an administrator of the VC 16B administrator may define VC DVIPA B 625 (along with other attributes). When the VC 16B is deployed it connects attempting to Bind to VC DVIPA B. The VNIC 13B associated with the VC 16B performs the functions described, poll, find, wait etc. to find VC DVIPA B listed on OS 14A on stack Y. Once the communication protocol stack is selected, the VNIC 13H performs a poll and search for identifying the stack and waits for the stack activation process if the stack is not activated, at 1160.

In one or more examples, the administrator can configure the VC 16B with a stackname, for example, for stack Y and DVIPA 625. The DVIPA must match the one provided by the administrator in the VIPARANGE command when creating the VC DVIPA. If this is the case then this specific stack Y must have the matching DVIPA specified. If the stack Y does not include the specified DVIPA, then a search/poll exit occurs.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method comprising: receiving, by an operating system of a computer server, a request to execute an instance of a computer application that is non-native to the operating system of the computer server; based on a determination that the computer application is a non-native application for the operating system: deploying, by the operating system, a virtual container for the instance of the computer application, wherein the virtual container is allocated a dynamic virtual internet protocol address (DVIPA) from a range of IP addresses defined as DVIPAs within a VIPA range definition; instantiating, by the operating system, an application instance of the computer application in the virtual container; based creating, by the operating system, for the virtual container, a virtual network interface card (NIC) that translates network communication between the application instance and a physical NIC of the computer server; identifying, by the virtual NIC, an instance of a communication protocol stack of a plurality of communication protocol stacks of the operating system that provides optimal IP routing support for the non-native application using one or more configuration parameters provided in the VIPA range definition; and selecting, by the virtual NIC, the identified instance of the communication protocol stack to bind the application instance for transferring network communication between the virtual NIC and the physical NIC; and in response to receiving a second request to execute an instance of a second computer application that is native to the operating system of the computer server, deploying a user space that hosts the native application instance; wherein a virtual NIC is only created for virtual containers built for non-native applications while native applications in the user space do not receive a virtual NIC assignment.

2. The computer implemented method of claim 1, wherein another application instance in the operating system cannot access the DVIPA of the virtual container that hosts the non-native application.

3. The computer implemented method of claim 1, wherein the communication protocol stack is selected from the plurality of communication protocol stacks from the operating system of the computer server.

4. The computer implemented method of claim 1, wherein the computer server is a first computer server from a server cluster, and wherein the communication protocol stack is selected from the plurality of communication protocol stacks from a second operating system of a second computer server from the server cluster in response to the communication protocol stack not being present in the first computer server.

5. The computer implemented method of claim 1, wherein the virtual NIC includes a south bridge that converts network communication to/from specifications of the physical NIC.

6. The computer implemented method of claim 1, wherein the virtual NIC includes a north bridge that converts network communication to/from specifications of the application instance.

7. The computer implemented method of claim 1, further comprising:

creating, by the operating system, a unique internal Internet Protocol (IP) route for network communication between a physical network interface card (NIC) and the application instance.

8. A system comprising: a physical network interface card (NIC); a memory; and a processor coupled with the physical NIC and the memory, the processor configured to perform network virtualization using a method that comprises: receiving, by an operating system of a computer server, a request to execute an instance of a computer application that is non-native to the operating system of the computer server; based on a determination that the computer application is a non-native application for the operating system: deploying, by the operating system, a virtual container for the instance of the computer application, wherein the virtual container is allocated a dynamic virtual internet protocol address (DVIPA) from a range of IP addresses defined as DVIPAs within a VIPA range definition; instantiating, by the operating system, an application instance of the computer application in the virtual container; based creating, by the operating system, for the virtual container, a virtual network interface card (NIC) that translates network communication between the application instance and the physical NIC; identifying, by the virtual NIC, an instance of a communication protocol stack of a plurality of communication protocol stacks of the operating system that provides optimal IP routing support for the non native application using one or more configuration parameters provided in the VIPA range definition; and selecting, by the virtual NIC, the identified instance of the communication protocol stack to bind the application instance for transferring network communication between the virtual NIC and the physical NIC; in response to receiving a second request to execute an instance of a second computer application that is native to the operating system of the computer server, deploying a user space that hosts the native application instance;

wherein a virtual NIC is only created for virtual containers built for non-native applications while native applications in the user space do not receive a virtual NIC assignment.

9. The system of claim 8, wherein another application instance in the operating system cannot access the DVIPA of the virtual container that hosts the non-native application.

10. The system of claim 8, wherein the communication protocol stack is selected from the plurality of communication protocol stacks from the operating system of the computer server.

11. The system of claim 8, wherein the computer server is a first computer server from a server cluster, and wherein the communication protocol stack is selected from the plurality of communication protocol stacks from a second operating system of a second computer server from the server cluster.

12. The system of claim 8, wherein the virtual NIC includes a south bridge that converts network communication to/from specifications of the physical NIC.

13. The system of claim 8, wherein the virtual NIC includes a north bridge that converts network communication to/from specifications of the application instance.

14. The system of claim 8, further comprising:

creating, by the operating system, a unique internal Internet Protocol (IP) route for network communication between a physical network interface card (NIC) and the application instance.

15. A computer program product comprising a computer readable storage medium, the computer readable storage medium comprising computer executable instructions, which when executing by a processing unit causes the processing unit to perform a method comprising: receiving, by an operating system of a computer server, a request to execute an instance of a computer application that is non-native to the operating system of the computer server; based on a determination that the computer application is a non-native application for the operating system: deploying, by the operating system, a virtual container for the instance of the computer application, wherein the virtual container is allocated a dynamic virtual internet protocol address (DVIPA) from a range of IP addresses defined as DVIPAs within a VIPA range definition; instantiating, by the operating system, an application instance of the computer application in the virtual container; based creating, by the operating system, for the virtual container, a virtual network interface card (NIC) that translates network communication between the application instance and a physical NIC of the computer server; identifying, by the virtual NIC, an instance of a communication protocol stack of a plurality of communication protocol stacks of the operating system that provides optimal IP routing support for the non-native application using one or more configuration parameters provided in the VIPA range definition; and selecting, by the virtual NIC, the identified instance of the communication protocol stack to bind the application instance for transferring network communication between the virtual NIC and the physical NIC; in response to receiving a second request to execute an instance of a second computer application that is native to the operating system of the computer server, deploying a user space that hosts the native application instance; wherein a virtual NIC is only created for virtual containers built for non-native applications while native applications in the user space do not receive a virtual NIC assignment.

16. The computer program product of claim 15, wherein the communication protocol stack is selected from the plurality of communication protocol stacks from the operating system of the computer server.

17. The computer program product of claim 15, wherein the computer server is a first computer server from a server cluster, and wherein the communication protocol stack is selected from the plurality of communication protocol stacks from a second operating system of a second computer server from the server cluster.

18. The computer program product of claim 15, wherein the virtual NIC includes a south bridge that converts network communication to/from specifications of the physical NIC.

19. The computer program product of claim 15, wherein the virtual NIC includes a north bridge that converts network communication to/from specifications of the application instance.

20. The computer program product of claim 15, further comprising:
creating, by the operating system, a unique internal Internet Protocol (IP) route for network communication between a physical network interface card (NIC) and the application instance.

* * * * *